R. H. LUCAS.
PROCESS OF REFRIGERATION.

No. 183,406. Patented Oct. 17, 1876.

2 Sheets—Sheet 1.

Attest:
William Haines
Lauartin Osborn

Inventor:
Robert Hume Lucas

2 Sheets—Sheet 2.

R. H. LUCAS.
PROCESS OF REFRIGERATION.

No. 183,406.   Patented Oct. 17, 1876.

Attest:  
William Aarney  
Lamartine Osborn

Inventor:  
Robert Hume Lucas

N. PETERS, PHOTO-LITHOGRAPHER, WASHINGTON, D. C.

UNITED STATES PATENT OFFICE.

ROBERT H. LUCAS, OF SAN FRANCISCO, CALIFORNIA.

IMPROVEMENT IN PROCESSES OF REFRIGERATION.

Specification forming part of Letters Patent No. 183,406, dated October 17, 1876; application filed July 14, 1876.

*To all whom it may concern:*

Be it known that I, ROBERT HUME LUCAS, of the city and county of San Francisco, State of California, have invented a new and Improved Method or Process of Refrigeration, or the production of a cold atmosphere for curing and preserving purposes, of which the following is a specification:

My invention relates to an improved method of refrigeration, or the production of a cold atmosphere in curing and packing houses, refrigerators, and other places where it is desired to cure or preserve meats, fruits, &c.

The object of my invention is to produce an atmosphere having a low temperature, and being at the same time dry and free from all impurities.

The means whereby I accomplish this consists in the application of a non-congealable saline liquid in immediate contact with or exposed to the atmosphere, and having immersed in it a pipe or pipes containing and conducting a refrigerant gas. By this arrangement the refrigerant gas keeps the non-congealable liquid at or below the freezing-point of water, while the liquid acts upon the atmosphere passing in contact with it to absorb all its impurities and moisture, and keep it at a low temperature, as will more fully appear hereafter.

Figure 1:
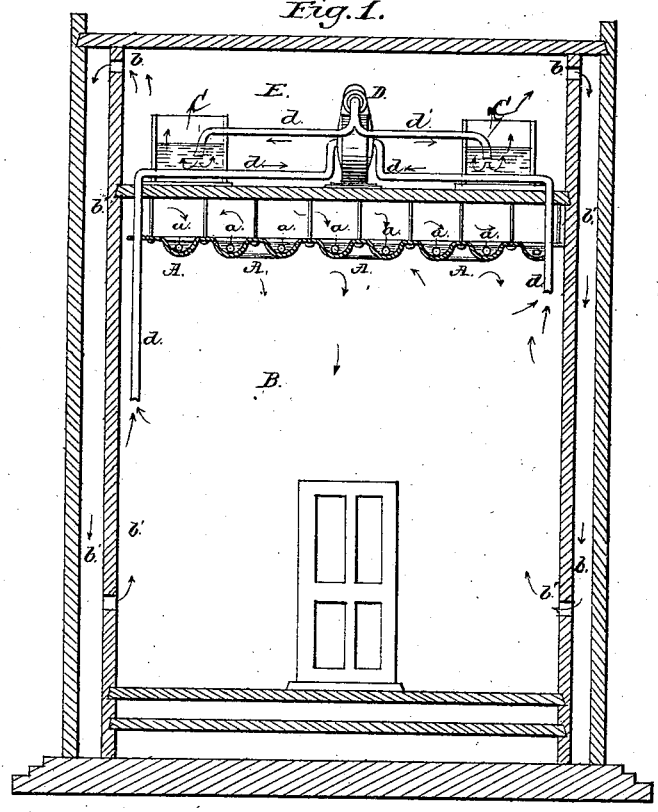
Figure 2:
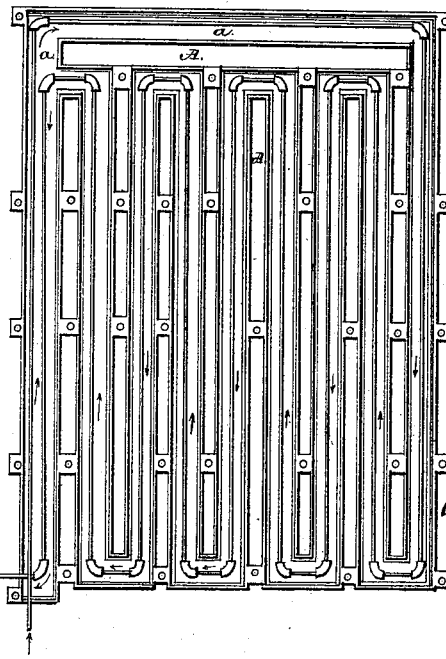
Figure 3:
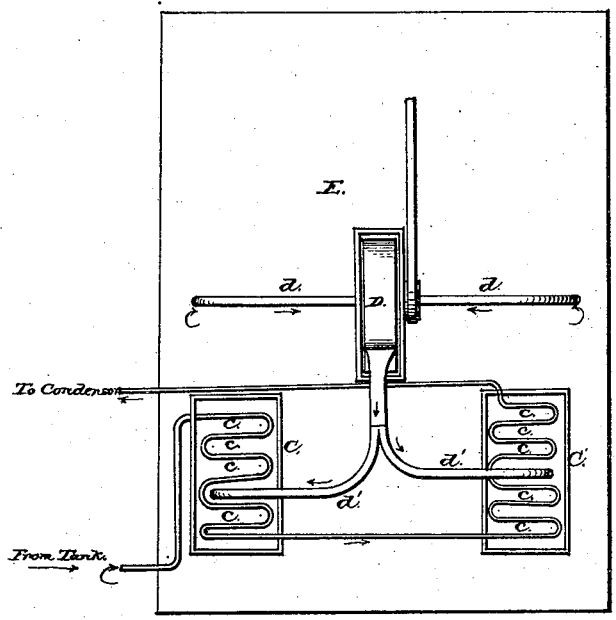
Figure 4:
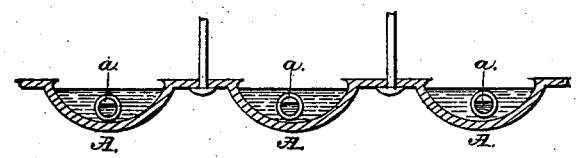

Figure 1 of the accompanying drawing illustrates the application of my invention to a room or refrigerator of a curing and packing house, showing the arrangement of troughs and conductors for the non-congealable liquid and the refrigerant gas, and a means for producing a circulation and intimate contact of the atmosphere with and through the liquid. Fig. 2 is a top view of the troughs for the non-congealable liquid and the conductors for the refrigerant gas. Fig. 3 is a top view of the apparatus for producing an increased circulation of the atmosphere, and a more immediate contact of it with non-congealable saline liquid. Fig. 4 is a vertical section through several of the troughs and conductors.

The following description of the nature and application of my invention is sufficiently full and clear to enable any person familiar with the art or science to which it pertains to construct and apply or use the same.

The subject of refrigeration has thus far been attended with many objections and difficulties, from the fact that it has been impossible to produce an exceeding cold and at the same time a dry atmosphere. Articles placed in the vicinity of ice, or having cold air blown over them which has been in contact with ice, can only be reduced to a certain temperature, for the air so treated is more or less saturated with moisture, and the various methods or arrangements for cooling the air of rooms, or other apartments, by means of pipes containing a refrigerant, have all been attended with the same objections, from the fact that the condensation upon the pipes of the particles of moisture in the air forms a thin coat of frost or ice on the outside that acts as a non-conductor, and becomes a formidable barrier to the passage of heat, and thus only a moderate degree of cold can be produced.

I find, however, that, by the use or application of a non-congealable saline liquid, kept at a low temperature, at or below the freezing-point, by having a refrigerant gas pass through it, will, when in immediate contact with the atmosphere of a room or chamber, reduce and keep its temperature in a very cold condition, while the strong affinity of the saline liquid for all moisture and odors or impurities that may exist in the room will cause them to be absorbed and the atmosphere rendered pure and dry. This non-congealable liquid, as brine, or a solution of salt and saltpeter, I expose in troughs or shallow vats A A, suspended from the ceiling, or placed in the upper part of a room or chamber, B, and through this liquid I conduct a refrigerant gas by means of pipes *a a*. Suitable connections with a pump and a tank or receiver holding the liquefied gas, and with a condenser, are made to produce a circulation of the refrigerant through the pipes to the condenser, as in the usual way of employing refrigerant gases. The walls of the room or chamber are made air-tight that the higher atmosphere from without may not affect the lower atmosphere within, and the apparatus is complete.

The refrigerant agent I employ is anhydrous ammonia; but I do not propose to confine myself to any particular medium for producing the necessary cooling of the non-congealable saline liquid.

The troughs A A are made either of wood or of metal, with spaces between them, to permit a perfect circulation of the air around and over them, and they are placed at or suspended from the upper part of the room or chamber in the warmest stratum of air, that the action upon the atmosphere will produce a natural circulation of the cold and warm particles.

In situations where an increase of cold or a lower degree of temperature is desired, as in the curing of meats in the store-rooms of packing-establishments, &c., I make use of, and arrange, one or more vats, C C, of the non-congealable saline liquid, kept at a low temperature by surrounding, or having immersed in it, the pipes $c\ c$, containing the refrigerant gas, and through this liquid I force the atmosphere of the chamber B by means of the fan D, propelled by suitable power.

This apparatus I arrange above the refrigerator-room or chamber B, and connect the fan D with the air to be cooled by means of the pipes $d\ d$ that extend down into the room. The air of this apartment E communicates with the chamber B through the outlets $b\ b$ and channels and inlets $b'\ b'$, and the air is forced by the fan through the pipes $d'\ d'$. By this means I draw off the air from the chamber A through the pipes $d\ d$, and after forcing it through, and in intimate contact with, the non-congealable liquid, I return it to the chamber again through the openings and channels $b\ b\ b'\ b'$. Thus the coldness of the atmosphere is greatly intensified, and its moisture, odors, and impurities, exhaled or given off by the substances in the chamber, are absorbed and retained by the non-congealable liquid, whose affinity for such particles is very great, and the air is returned and circulates through the chamber at an exceedingly low temperature, and in a state of dryness.

The troughs A A, and the pipes or conductors $a\ a$, I use either by themselves or in connection with the fan D, its vats C, and pipes $d\ d\ d'\ d'$.

In cases where a very low degree of cold is desired, as in the curing of meats, the combination of the two arrangements of apparatus will be necessary; but the application of the non-congealable liquid surrounding, or having immersed in it, the refrigerant pipes, will produce a sufficient degree of cold for ordinary refrigerating purposes. As the action of the non-congealable saline liquid in absorbing the aqueous particles or vapors keeps the air in a state of dryness, it can be reduced to a much lower degree of temperature than can be produced by the use of ice, or by refrigerant agents inclosed in pipes or conductors.

The application of my invention on a large scale is of great value when substituted for the large body of ice that is now used in curing and packing-houses.

The apparatus shown in the accompanying drawings requires but little space, and by means of the very low and dry state of the atmosphere, produced by the action of the non-congealable liquid, I am enabled to cure and preserve meats, and other substances, in a better and more effectual manner than has heretofore been done.

Having thus fully described the nature and application of my invention, what I claim as new, and desire to secure by Letters Patent, is—

1. The process herein described of producing a low degree of temperature for curing and preserving purposes, consisting of the circulation of air over and around troughs containing a non-congealable saline liquid and of a refrigerant gas, through tubes or pipes immersed in said liquid, substantially as hereinbefore set forth.

2. In combination with a refrigerating-room, B, provided with the saline troughs and refrigerant gas-pipes A $a$, the chamber E, provided with non-congeable saline troughs C C, pipes $c\ c$, and fan D, and pipes $d\ d\ d'\ d'$, the upper and lower chambers connected by channels and openings $b\ b\ b'\ b'$, whereby a free circulation is obtained, in the the manner and for the purposes described.

In witness whereof I have hereunto set my hand and seal this 5th day of June A. D. 1876.

ROBERT HUME LUCAS. [L. S.]

In presence of—
WILLIAM HARNEY,
LAMARTINE OSBORNE.